United States Patent [19]
Hunter, Jr.

[11] 3,889,171
[45] June 10, 1975

[54] BATTERY CHARGER
[75] Inventor: Thomas C. Hunter, Jr., Winchester, Mass.
[73] Assignee: Standby Systems, Inc., Medford, Mass.
[22] Filed: Oct. 12, 1973
[21] Appl. No.: 405,844

Related U.S. Application Data
[63] Continuation of Ser. No. 258,815, June 1, 1972, abandoned, which is a continuation of Ser. No. 60,255, Aug. 3, 1970, abandoned.

[52] U.S. Cl. .................. 320/31; 320/35; 320/39; 323/19
[51] Int. Cl............................ H02j 7/04; H02j 7/16
[58] Field of Search ............ 320/35, 36, 39, 31, 32, 320/DIG. 1, 22; 323/9, 19, 68, 69; 307/297

[56] References Cited
UNITED STATES PATENTS

| | | | |
|---|---|---|---|
| 2,875,396 | 2/1959 | Christie et al. | 320/35 X |
| 3,453,519 | 7/1969 | Hunter, Jr. | 320/35 X |
| 3,457,489 | 7/1969 | Gentry, Jr. et al. | 320/22 |
| 3,531,706 | 9/1970 | Mullersman | 320/35 X |

Primary Examiner—J. D. Miller
Assistant Examiner—Robert J. Hickey
Attorney, Agent, or Firm—Kenway & Jenney

[57] ABSTRACT

A battery charging circuit with a series current-limiting transistor varying in conductivity as a continuous function of the charging current and the terminal voltage of the battery. The conductivity of the transistor is controlled by a circuit including a thermistor, and is varied as a function of the difference between a reference potential and a variable potential, the latter being a function of plural conditions including the battery terminal voltage and the magnitude and duration of the charging current. The difference potential is measured across a bridge circuit that can be compensated for ambient temperature.

11 Claims, 3 Drawing Figures

PATENTED JUN 10 1975  3,889,171

INVENTOR
THOMAS C. HUNTER, JR.

BY Kenway, Jenney &
Hildreth

ATTORNEYS

BATTERY CHARGER

This is a X continuation, of application Ser. No. 258,815, filed June 1, 1972, now abandoned, which is a continuation of Ser. No. 60,255, filed Aug. 3, 1970 and also abandoned.

BACKGROUND OF THE INVENTION

It has been common practice to employ a transistor or some other form of variable series impedance or current limiter in the charging of batteries. A variable current limiter affords a means of overcoming problems that arise from the peculiar properties of batteries that depend on the plate materials and the electrolytes employed. These properties are briefly discussed below.

A fully charged battery disconnected from its external load circuit has a voltage across its terminals called its "rest potential." A practical battery of the type with which this invention is concerned has an internal self-discharge circuit that continuously draws current of a magnitude or level increasing with the age of the battery. Because of the self-discharge current, if the battery is to be continuously maintained at its full charge by connection with a charging circuit, that circuit must deliver a small current to the battery continuously even when the external load circuit is open. This is accomplished by applying to the battery terminals a "float potential" slightly above the rest potential.

In lead-acid batteries, if a charging circuit applies the float potential continuously to the battery it will not only maintain a full charge on the battery, but will in time fully recharge a battery that has been partially discharged. However, this is not true of other types of batteries, for example alkaline batteries such as nickel-cadmium batteries and the like. Typically, once such batteries are partially discharged, they will recharge only to a small fraction, such as 30 or 40 percent, of their previous charge when a charging circuit applies no more than the float potential to their terminals. To recharge such a battery fully, it has long been recognized that a "surcharge potential" above the float potential must be applied for a limited time period herein called the "surcharge interval." In a suitable charging circuit, when a sufficiently high potential is applied through an impedance to a typical substantially discharged nickel-cadmium battery, it is found that its terminal voltage will increase substantially linearly with time until it attains 70 to 80 percent of its full charge. At about this time its terminal voltage, which will have reached only a fraction of the surcharge potential, will begin to rise at a much faster rate until it reaches the surcharge potential, and thereafter it will remain substantially at this potential during the surcharge interval. During this interval bubbling will occur and gas will be released from the electrolyte. It is necessary for bubbling to occur during this interval in order for the battery to reattain its full charge. However, it is desirable to reduce the applied potential at the battery terminals to the float potential once a full charge has been reached, as excessive bubbling leads to loss of electrolyte.

Thus a problem exists in determining when to reduce the applied voltage at the battery terminals. Various means for automatic voltage reduction have been proposed. In these circuits the charging source is capable of developing a voltage greater than the surcharge potential and a variable series current limiter, impedance or plural interchangeable impedances are employed in the charging circuit. The impedance or impedances are intended to have a value adapted to permit charging current to flow into the battery both before and during the surcharge interval, after which the impedance is increased to a value adapted to maintain only the float potential at the battery terminals. Many of these circuits are voltage responsive and increase the impedance when the battery terminal voltage reaches a certain value, but this is satisfactory only when that voltage is definitive of the fully charged state. This is usually true in the case of a lead-acid battery which exhibits a linear rise in terminal voltage as a function of time up to the fully charged state. In the case of a nickel-cadmium battery or the like, it is often unsatisfactory because the voltage at the battery terminals typically changes relatively little during the surcharge interval. A voltage responsive circuit might cause the surcharge potential to be terminated nearer the beginning of the surcharge interval rather than near the end, which would result in failure to recharge the battery fully.

In my U.S. Pat. No. 3,453,519, dated July 1, 1969, I describe circuits that overcome this difficulty by responding not only to the terminal voltage of the battery but also to a further circuit parameter, namely, the current flowing into the battery. This current remains at a substantial level both before and during the surcharge interval, but begins to diminish near the end of that interval. In the particular circuits described in the patent, means are provided to cause a series current limiting transistor to be conductive when the battery terminal voltage is below the float potential, and further means are provided to introduce a substantial added increment of conductivity to the transistor whenever the charging current flow is at a substantial level. This increment maintains a flow of charging current during the surcharge interval that persists until the battery has reached a full charge. At this point the battery begins to suppress the flow of current, and when the current has been sufficiently diminished the increment of conductivity in the transistor is automatically removed. This leads quickly to a reduction in the voltage applied to the battery to the float potential level.

In the circuits of said patent, the current responsive means consist of a thermal switch that responds to heat generated by the flow of current in the series current-limiting transistor. The circuits are regenerative during charging in that the initially depressed terminal voltage of the discharged battery causes conductivity in the transistor and the resulting heat generated as a result of the charging current flow operates the thermal switch to add an increment of conductivity to cause a further increase in the charging current flow. The circuits are also degenerative after a full charge has been reached in that the gradual suppression of current flow due to the battery reaching a full charge is eventually sufficient to remove the added increment of conductivity, thereby further interrupting or substantially limiting the current flow.

A circuit according to said patent that is designed to operate in a satisfactory manner under certain conditions may not perform equall well under other conditions. First, by its nature as a bistable or two-state element, the switch can only insert or remove a fixed increment of conductivity and charging current, regardless of the size of the battery. Thus it cannot add a larger increment for a larger battery. A larger battery will consequently take longer to recharge than a smaller one if both are assumed to be initially discharged to the same fraction of full charge.

Second, there may be conditions that delay or prevent the thermal switch from changing its position or state. The temperature of the switch results from its own thermal capacity and its rate of heat outflow by dissipation to the environment and heat inflow from the series transistor. The rate of heat outflow is affected by the ambient temperature which may result in undesirably lowering the charging rate or preventing a full recharge at colder ambient temperatures, or undesirably increasing the charging rate at higher ambient temperatures. Also, the rate of heat inflow from the transistor for any battery that is only slightly discharged, or is drawing only a small charging current due to its small size, may be insufficient to cause the switch to change its state, in which case the surcharge potential is not applied and the battery fails to be fully recharged for the reasons previously given.

SUMMARY OF THE INVENTION

This invention provides an improved battery charging circuit of the regenerative-degenerative type that is free of the limitations of use discussed above. Thus it performs efficiently to recharge either large or small batteries, furnishing each with a current adequate to recharge it within a reasonable and controllable period of time. In each case the surcharge potential is promptly applied, and is removed when a full charge has been reached. Also, the circuit can be compensated for ambient temperature so that it will perform reliably in all commonly encountered environments, climates, and seasons.

A feature of this invention is the use of circuit elements that have impedance properties varying continuously as a function of temperature, such as thermistors. This eliminates some of the problems hitherto noted in connection with step function devices such as thermal switches.

A second and related feature is the structural relationships of the circuit elements and parts as they effect the temperature of the thermally responsive elements.

A further feature is the provision of means for ambient thermal compensation by the use of a second thermistor responsive to the ambient temperature.

The foregoing and other features will be more clearly understood by references to the following description and the appended drawings to which it refers.

DESCRIPTION OF THE PREFERRED EMBODIMENT

Figure 1:
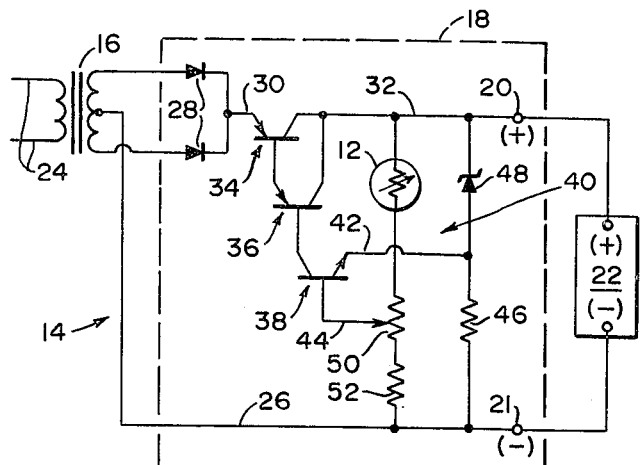
FIG. 1 is a schematic circuit diagram showing a simplified form of the present invention.

FIG. 1 illustrates a simplified form of the invention employing a single thermistor 12. The battery charger is designated generally at 14 and comprises a transormer 16 and a charging circuit 18 enclosed within broken lines. The circuit has terminals 20 and 21 for connection of a battery 22 to be charged. Leads 24 are provided for connection to an external source of alternating current power.

The secondary winding of the transformer 16 has a center tap connected with a lead 26 that is in turn connected to the terminal 21 and the negative side of the battery 22. The ends of the secondary winding are connected through rectifiers 28 to a lead 30, thereby providing a conventional circuit for full-wave reactification. The lead 30 is connected with a lead 32 and the terminal 20 through the emitter-collector junction of a PNP current limiting or regulator transistor 34. The base of the transistor 34 is connected with the emitter of an amplifier PNP transistor 36 having its collector connected in common with that of the transistor 34. The base of the transistor 36 is connected with the collector of an NPN voltage difference detector transistor 38.

A bridge control circuit designated generally at 40 is connected between the leads 26 and 32 and comprises two branches respectively connected by leads 42 and 44 with the emitter and base of the transistor 38. One branch is a reference circuit comprising a resistor 46 and a Zener diode 48. The other branch comprises the thermistor 12, a potentiometer 50 and a resistor 52. As is generally known, the property of a Zener diode is that it has a high resistance to a current flow at voltages less than a critical breakdown voltage, and after breakdown it has a variable current, constant voltage characteristic. In the circuit of FIG. 1, the voltage between the leads 26 and 32 is divided between the diode 48 and the resistor 46 but is sufficient under all operating conditions to cause breakdown of the diode, thus establishing a substantially constant voltage across it irrespective of the battery terminal voltage. This constant voltage is maintained during the operation of the circuit, both before and after the battery has reached a full charge.

The properties of thermistors are also generally understood, and in the present case the thermistor 12 has a resistance that is inversely related to its temperature, this relationship being a continuous function, as contrasted to the properties of a switch or similar electromechanical two-position device.

In the following description the reference to the voltages or potentials at points in the circuit refer to the voltage differences between such points and the lead 26 used as a reference, unless another point of reference is started.

If the circuit of FIG. 1 is connected with a fully charged battery, thereby initially applying the rest potential of the battery to the lead 32, the potentiometer 50 is normally so adjusted as to cause the base of the detector transistor 38 to be slightly positive with respect to its emitter. Under these conditions a small current will flow from the rectifier through the lead 30, through the emitter-base junctions of the transistors 34 and 36, through the collector-emitter junction of the transistor 38 and the resistor 46, returning through the lead 26 to the rectifier. The emitter-base current in the transistor 36 results in conduction through the emitter-collector junction of this transistor, thereby amplifying the emitter-base current through the regulating transistor 34. As a result, a trickle current flows to the battery through the emitter-collector junction of the transistor 34, this current being sufficient to maintain the battery in the fully charged state. This establishes an average d.c. voltage on the lead 32 equal to the float potential.

A stable circuit condition is thereby established and continues while the battery remains fully charged as described. The temperature of the thermistor 12 remains substantially at the ambient value.

On the other hand, if the battery 22 were discharged its terminal voltage applied across the leads 26 and 32 would be below the rest potential. As noted above, this reduction in voltage would be insufficient to interrupt the conductive state of the Zener diode 48, and therefore the voltage across this diode would remain the same. The circuit would operate to supply a substantial charging current to the battery, as follows. Let D represent the diode in the voltage on the lead 32 from the rest potential that would be applied by a fully charged battery. Since the voltage drop across the diode 48 remains constant, the voltage across the resistor 46 would decrease by the full value of D, and therefore the voltage on the lead 42 would drop by this value. The voltage on the lead 44 would also drop, but in this case the drop would only be a fraction of D and would depend upon the ratio of the impedances in the branch circuit comprising the thermistor 12, the potentiometer 50 and the resistor 52. Therefore, the potential difference between the leads 42 and 44 would increase and the current in the collector-emitter circuit of the transistor 38 would increase. Through the transistors 34 and 36 operating as described above, the current through the emitter-collector circuit of the transistor 34 to the battery would therefore increase and the battery would begin to charge. The magnitude of this current would be larger for larger values of D as a result of the amplifying properties of the transistor circuit.

As the charging current continues to flow, heat is evolved by the various circuit elements, and in particular by the transistor 34, thereby elevating the temperature of the thermistor 12. This will be clearly evident from FIG. 3 which shows the physical and thermal relationships of the various circuit parts. The outer metal housing of the battery charger is shown in fragmentary form at 54. An extruded aluminum plate 56 having integral heat radiating fins 58 is mounted to the housing 54 by screws and nuts 60 and heat insulating standoffs 62. Between the fins 58 is supported a printed circuit board 64 upon which are supported all of the circuit elements, including the transistor 34, which are enclosed within the broken lines designated at 18 in FIG. 1. Of these elements, only the potentiometer 50 and thermistor 12 are shown on the illustrated face of the circuit board, the other elements being physically located, mounted and connected in a conventional manner on the opposite face thereof. The entire circuit board 64 and all of the circuit parts mounted thereon except the potentiometer 50 are fully covered by a thermally conductive epoxy potting compound 66. The rectifiers 28 are mounted directly on the plate 56. Since the potting compound has appreciable heat conductivity, the temperature of the thermistor 12 will be affected to some extent by heat evolved through the flow of current in all of the circuit elements including the rectifiers as well as those elements imbedded in the potting compound.

It will be noted that this arrangement provides a certain degree of thermal inertia or lag, since heat is also radiated to the atmosphere, especially by the fins 58.

As a result of the increase in temperature of the thermistor 12 as described above, its resistance decreases, thereby causing the voltage at the lead 44 to become more positive. This increases the potential difference between the leads 42 and 44 and increases conduction in the transistor 38, thereby further increasing the current flowing to the battery through the emitter-collector circuit of the transistor 34. Thus the flow of charging current operates through a heat-induced reduction in the resistance of the thermistor 12 to increase the flow of current to charge the battery. The effect is regenerative and continues to increase the charging current until the thermistor temperature becomes constant and at an elevated level.

While the charging current is flowing as described above the terminal voltage of the battery typically rises linearly with time until the battery reaches about 70 to 80 percent of its full charge, and then the voltage rises at a more rapid rate to the surcharge level. After reaching this level it remains substantially constant until a full charge is attained, which causes a reduction in the charging current. The reduction in current contributes to a degenerative effect. Conduction in the transistor 34 is reflected in a progressive lowering of the temperature of the thermistor 12. The resulting increase in the resistance of the thermistor 12 operates through the bridge circuit 40 to decrease the difference in voltage between the leads 42 and 44, suppressing current flow in the transistor 38. This in turn suppresses current flow in the transistors 34 and 36 and results in a further decrease in the current flowing in the lead 32 to the battery. The rise in the impedance of the emitter-collector junction of the transistor 34 reduces the voltage between the terminals 20 and 21. The result is that new circuit conditions are ultimately established in which the float potential appears between the terminals 20 and 21 and only sufficient trickle current is flowing in the battery 22 to compensate for its self-discharge current.

During the charging of a battery as described above, the current flowing to the battery is in excess of that required to maintain it at its normal terminal voltage, and this excess may be called the overcharge current. During the surcharge interval, the battery voltage will rise to a level above that at which the sensing circuit would cause the transistor 38 to be conductive if the thermistor 15 were then at its ambient temperature and resistance. The magnitude of this higher voltage results from the elevated temperature of the thermistor 12 which is dependent in turn upon the magnitude of the charging current and the time during which it has continued. Therefore, a badly discharged battery will, by drawing a charging current of longer duration, receive a greater overcharge current than a slightly discharged battery, because of the lower magnitude of the charging current and the shorter time during which it is allowed to heat up the thermistor 12 in the latter case.

Preferably, the rectifier voltage should have an average d.c. value typically not more than 25 percent greater than the rest potential of the battery to be charged. As described previously, as the charging current flows the battery terminal voltage will rise. During the surcharge interval it will continue to rise. If the thermistor 12 were at ambient temperature, the latter voltage would only have to rise to the float potential in order to terminate the charge current by reducing the conductivity of the base-emitter junction of transistor 38. However, because of the increased conductivity of the thermistor 12 the battery terminal voltage must exceed its normal float potential in order to produce that result. The cycle of lower charging current - lower temperature - lower sensing circuit voltage will then continue until the thermistor 12 has returned to the ambient temperature, thus stabilizing the sensing circuit and therefore the battery terminal voltage at its float potential.

The length of the surcharge interval may be increased by attaching the power transistor 34 to a mass with a substantial amount of thermal inertia, for example an iron block. An iron block does not conduct heat readily, and once heated it will cool slowly. Therefore, if thermistor 12 were mounted on top of transistor 34, both would heat up rapidly in response to a large charging current due to the inability of the iron block to conduct the heat away quickly. This rapid heating would thereby insure an overcharge. If the charge duration were short the large iron mass would absorb much of the heat generated, and thus tend to delay the initiation of an overcharge current. Should the charge continue for a longer period of time the entire iron block would become quite warm and therefore, after the battery has become fully charged and the charging current has dropped to a low value, the heat stored in the iron block would maintain the transistor 34 and thermistor 12 at an elevated temperature for a longer period of time as determined by the mass of the block and the temperature to which it was raised. In this manner the period of the overcharge can be varied by the thermal properties of the mounting device for the thermistor 12.

A convenient iron mass is the lamination stack of a power transformer of the type usually found in battery chargers and other types of electrical power supplies. Since the size of the transformer is proportional to the size of the battery to be charged, the iron laminations will provide a suitable thermal mass for overcharge purposes, as well as protecting the power transistor in the event of overloading by absorbing the excess heat generated.

Figure 2:
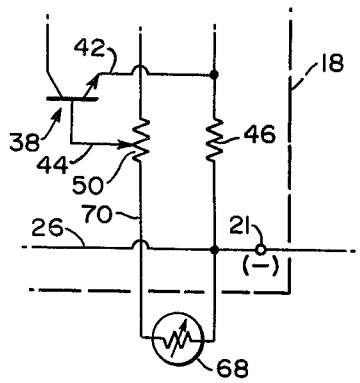
FIG. 2 is a similar diagram in fragmentary form showing a preferred form having means for ambient temperature compensation.
Figure 3:
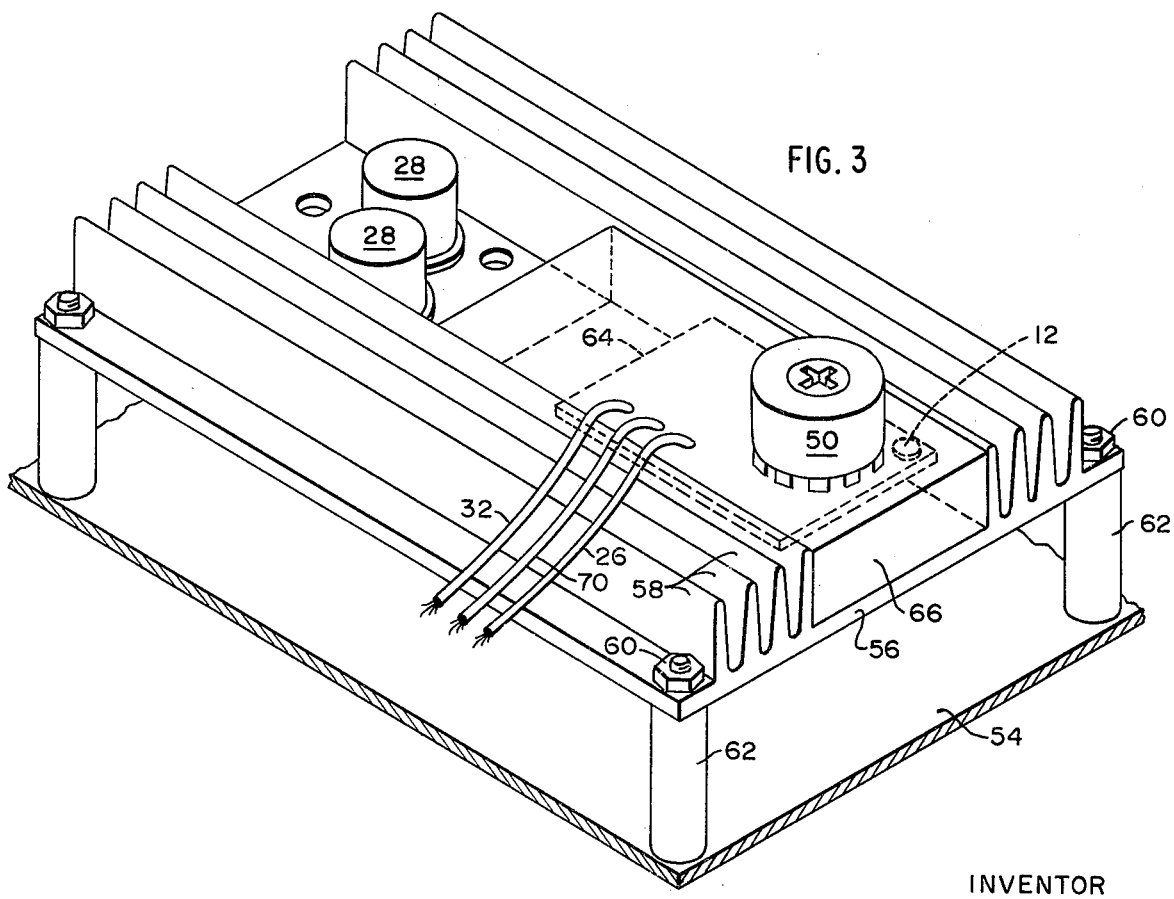
FIG. 3 is a partial diagonal view illustrating the mechanical structure and thermal relationships of the principal circuit elements.

The circuit of FIG. 2 is a fragmentary representation of a portion of the circuit of FIG. 1, modified by substituting a thermistor 68 for the resistor 52. In this case, as shown in FIG. 3 a lead 70 is brought out of the potting compound 66 to a suitable point sensitive substantially only to the ambient temperature, at which point the thermistor 68 is situated. In this circuit like parts are numbered the same as in FIG. 1. Compensation for ambient temperature results from the fact that the voltage between the leads 26 and 32 is divided between the thermistors 12 and 68 as well as the potentiometer 50, and the lead 44 is connected between the thermistors. By this means, any increase or decrease in the temperature of the thermistor 12 which is attributable to an increase or decrease in the ambient temperature is prevented from affecting the voltage at the lead 44, while any increase or decrease in the temperature of the thermistor 12 which is attributable to the flow of current generating heat in the circuit elements continues to have the same effect on the voltage of the lead 44 as discussed above with reference to FIG. 1.

The present invention provides a distinct advantage arising from the fact that even a small increase in the charging current automatically produces an increase in the temperature of the thermistor 12, bringing the bridge circuit 40 into operation to cause a increase in the conductivity of the transistor 34 to produce an increase in the flow of charging current. Thus the regenerative properties of the circuit are called into play whenever the temperature of the thermistor 12 is increasing, and the degenerative properties are similarly called into play whenever the temperature of the thermistor is decreasing. It is not necessary in either case for the change of temperature of the thermistor 12 to achieve a predetermined value, as is necessary in the case of the electro-mechanical thermal switches in my above-mentioned patent.

The circuits of FIGS. 1 and 2 have been shown in simplified form to facilitate description, and may be modified in various respects for convenience in circuit design. Also, the structural configurations, including transistor types and other details, may be modified if desired. For example, a silicon controlled rectifier may replace a transistor such as the transistor 34. Furthermore, the thermal inertia may be increased by embedding scrap iron or lead solder in the epoxy potting compound 66. The thermal inertia may also be decreased by adding one or more fins 58, or in any other convenient manner.

To illustrate still further possibilities for modifications, it is possible to use either positive temperature coefficient thermistors or negative temperature coefficient thermistors. The type of thermistor determines the arrangement of components in the bridge control circuit 40. Thus a thermistor having a resistance that increases with increasing temperature may be used instead of the thermistor 12 having a resistance that decreases with increasing temperature, by exchanging the positions of the thermistor and the resistor 52 in the circuit of FIG. 1.

It is to be further noted that although the above description points out the desirable properties of this invention with specific reference to nickel-cadmium batteries, this invention is useful for charging batteries of any other type having similar properties, and also batteries having different properties including lead-acid batteries and the like. One of the advantages to the circuit is its utility for charging a large variety of types of batteries completely and in a reasonably short period of time.

It will be understood that other circuit and structural modifications will occur to a person skilled in this art, and may be incorporated without departure from the spirit or scope of this invention.

I claim:
1. A battery charging circuit having, in combination,
   a direct current source,
   terminals for a battery having a predetermined float potential to be charged,
   a circuit connecting said source and terminals including a first variable impedance connected in series therewith,
   and control means including a thermally variable impedance varying as a continuous function of temperature and heat retaining and conducting means in position to transfer heat produced by current flowing in said first variable impedance to said thermally variable impedance, said control means being continuously responsive to increases in the temperature of said thermally variable impedance to produce corresponding decreases in the magnitude of said first variable impedance, said control means being continuously responsive to decreases in said current resulting from the charged state of the battery to produce corresponding increases in the magnitude of said first variable impedance continuously until said float potential is reached at said terminals.

2. A circuit according to claim 1, in which the first variable impedance is a transistor.

3. A circuit according to claim 2, in which the thermally variable impedance is a thermistor.

4. A circuit according to claim 1, with a second thermally variable impedance included in said control means and in heat exchange relation with the ambient temperature and adapted to compensate for the effects of changes in ambient temperature on said first-mentioned thermally variable impedance.

5. A circuit according to claim 1, in which the control means include a bridge circuit having a first branch adapted to produce a substantially constant reference potential, a second branch including said thermally variable impedance and adapted to produce a control potential varying therewith, and means responsive to the difference between said reference and control potentials to vary the magnitude of said first variable impedance.

6. A circuit according to claim 5, in which said second branch is connected between said terminals.

7. A circuit according to claim 5, in which said first and second branches are connected between said terminals.

8. A circuit according to claim 5, in which said second branch includes a second thermally variable impedance in heat exchange relation with the ambient temperature and adapted to compensate for the effects of changes in ambient temperature on said first-mentioned thermally variable impedance.

9. A circuit according to claim 8, in which said first and second branches are connected between said terminals.

10. A circuit according to claim 9, in which the first variable impedance is a transistor having its base-emitter circuit controlled by said means responsive to the difference between said reference and control potentials.

11. A battery charging circuit having, in combination, a direct current source, terminals for a battery having a predetermined float potential to be charged, and a first circuit connecting said source and terminals including in series therewith a first variable impedance having a control circuit for continuous variation of the magnitude of said impedance, said control circuit being connected between said terminals and including first means responsive to a decrease in the voltage therebetween to decrease said first variable impedance and second means including a thermally variable impedance varying as a continuous function of temperature and heat retaining and conducting means in position to transfer heat produced by current flowing in said first variable impedance to said thermally variable impedance, said second means being responsive to an increase in the temperature of said thermally variable impedance to decrease said first variable impedance, said second means being responsive to a decrease in said current resulting from the charged state of the battery to increase said first variable impedance continuously until said float potential is reached at said terminals.

* * * * *

UNITED STATES PATENT OFFICE
CERTIFICATE OF CORRECTION

PATENT NO. : 3,889,171
DATED : June 10, 1975
INVENTOR(S) : Thomas C. Hunter, Jr.

It is certified that error appears in the above-identified patent and that said Letters Patent are hereby corrected as shown below:

Column 1, line 46, "lineraly" should be --linearly--.

Column 2, line 61, "equall" should be --equally--.

Column 3, line 65, "sormer" should be --sformer--.

Column 4, line 48, "started" should be --stated--.

Column 5, line 13, "diode" should be --drop--.

Signed and Sealed this thirtieth Day of September 1975

[SEAL]

Attest:

RUTH C. MASON
Attesting Officer

C. MARSHALL DANN
Commissioner of Patents and Trademarks